United States Patent [19]

Huang

[11] Patent Number: 4,905,209

[45] Date of Patent: Feb. 27, 1990

[54] CORRELATION MATCH FILTER FOR PASSIVE SIGNAL DETECTION

[75] Inventor: Stanley S. Huang, Bellevue, Wash.

[73] Assignee: Honeywell Inc., Minneapolis, Minn.

[21] Appl. No.: 199,507

[22] Filed: May 27, 1988

[51] Int. Cl.$^4$ .............................................. G06G 9/00
[52] U.S. Cl. ..................................... 367/125; 367/100
[58] Field of Search ............ 367/7, 100, 135, 124–126, 367/901; 342/145, 194; 364/724.11, 724.12, 728.01, 728.05

[56] References Cited

U.S. PATENT DOCUMENTS

| | | |
|---|---|---|
| 2,834,956 | 5/1958 | Harris, Jr. . |
| 2,935,604 | 5/1960 | DiToro . |
| 3,054,999 | 9/1962 | Forbath et al. . |
| 3,103,009 | 9/1963 | Baker . |
| 3,111,666 | 11/1963 | Wilmotte . |
| 3,114,831 | 12/1963 | Birnbaum et al. . |
| 3,157,874 | 11/1964 | Alter et al. . |
| 3,173,139 | 3/1965 | Welti . |
| 3,310,665 | 3/1967 | Schimmel . |
| 3,495,242 | 2/1970 | Dickey, Jr. . |
| 3,514,585 | 5/1970 | Norsworthy . |
| 3,774,019 | 11/1973 | Cook . |
| 3,995,270 | 11/1976 | Perry et al. . |
| 4,006,421 | 2/1977 | Mermoz . |
| 4,011,438 | 3/1977 | Aufderheide et al. ......... 342/194 X |
| 4,045,795 | 8/1977 | Fletcher et al. . |
| 4,156,923 | 5/1979 | Lampe et al. . |
| 4,160,975 | 7/1979 | Steudel ........................... 342/194 X |
| 4,168,500 | 9/1979 | Brassaw ........................... 342/194 X |
| 4,198,704 | 4/1980 | Munson ........................... 367/125 X |
| 4,219,812 | 8/1980 | Rittenbach ...................... 342/194 X |
| 4,244,026 | 1/1981 | Dickey, Jr. ....................... 367/89 X |
| 4,247,903 | 1/1981 | Grudkowski et al. . |
| 4,471,785 | 9/1984 | Wilson et al. . |
| 4,532,603 | 7/1985 | Gerard . |
| 4,552,020 | 11/1985 | Auphan . |
| 4,796,236 | 1/1989 | Welles, II et al. ....................... 367/7 |

Primary Examiner—Thomas H. Tarcza
Assistant Examiner—Tod Swann
Attorney, Agent, or Firm—Whitham & Marhoefer

[57] ABSTRACT

A passive detection technique is based on correlation characteristics of split beam inputs with given relative rates between a detection sensor platform and a target source. The correlation coefficient (10, 12) between two phase offset beams is first computed and, at the same time, the relative angular position between the sensor line-of-sight and the target source are estimated (14) to establish the pattern matching function. The correlation operations are carried out for both real and imaginary channels with a four quadrant multiplier (20, 22, 24, and 26). The outputs of the multiplier are summed (28, 30) to obtain real and imaginary channel outputs which are smoothed over a period of time in integrators (32, 34) to eliminate undesirable correlation patterns. The outputs of the integrators are independently thresholded (36, 40) and square summed (38, 42 and 44) and then threshold (46) to provide an indication of target detection.

6 Claims, 2 Drawing Sheets

CORRELATION MATCH FILTER FOR PASSIVE SIGNAL DETECTION

BACKGROUND OF THE INVENTION

1. Field of the Invention

The present invention generally relates to signal detecting networks and, more particularly, to a passive detection technique based on correlation characteristics of split beam inputs with given angular rates between a detection sensor platform and a target source.

2. Description of the Prior Art

There are two approaches to the problem of detecting a target, such as a submarine, in a noise field, and they are the use of active or passive sonar. The subject invention belongs to the latter category. In general, passive sonar has three methods of detecting a target. These are an energy detector, a cross-correlation detector and a target angle variance detector. An energy detector usually processes power or amplitude level of a received signal. If the level exceeds a predetermined level, then a target is detected. On the other hand, a cross-correlator detector computes the cross-correlation coefficient between two phase offset beams. Since the magnitude of this correlation coefficient is different between the background noise and a target, a threshold can be set for target detection. The target angle variance detector uses the principle that the measurement of the angle variance from a pair of phase offset beams will drop from that for noise alone as soon as a target is present.

All these methods require a detection threshold with a signal-to-noise ratio range from zero to 10 dB which severly limits a target detection range. What is needed is a passive target detection system which is not as severly range limited as existing passive detection systems.

SUMMARY OF THE INVENTION

It is therefore an object of the present invention to provide a passive signal detection system which has a long range detection capability that is significantly improved over existing passive detection systems.

It is another object of the invention to provide a passive signal detection technique which can be applied to narrow or broadband signals of a target in correlated or non-correlated noise fields.

According to the invention, the correlation match filter first computes the correlation coefficient between two phase offset beams. At the same time, the relative angular position between the sensor line-of-sight and the target source are estimated to establish the pattern of a matching function. The correlation operations are carried out for both real and imaginary channels with a four quadrant multiplier. The outputs of the multipler are summed to obtain real and imaginary channels which are smoothed over a period of time to eliminate undesired correlation patterns. The summed outputs are then integrated and thresholded to obtain the detection outputs.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
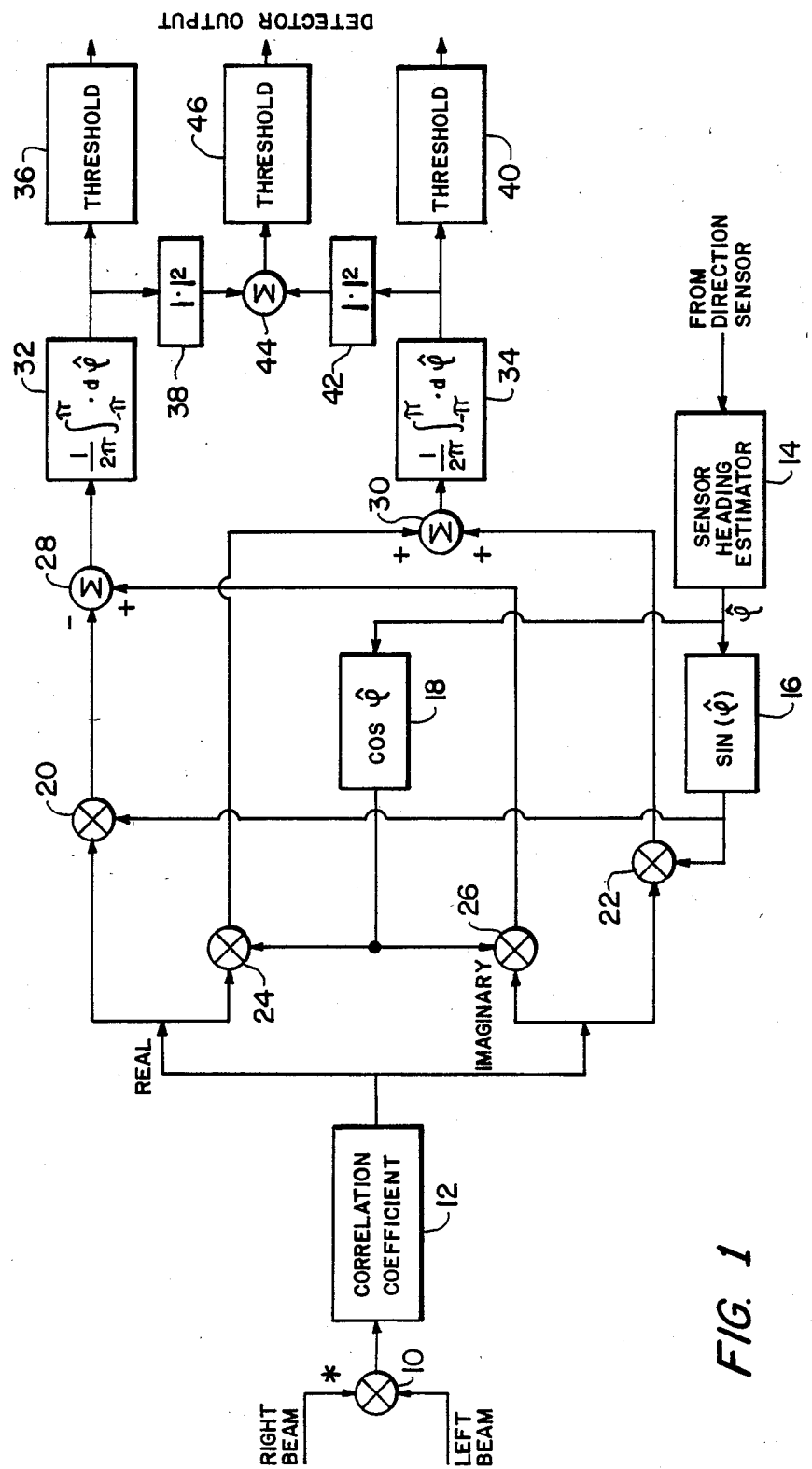
FIG. 1 is a block diagram of the correlation match filter according to the invention.

Referring now to the drawings, and more particularly to FIG. 1, there is shown in block diagram form the passive correlation match filter according to a preferred embodiment of the invention. A right beam signal and a left beam signal, which are phase offset from one another, are supplied, after signal conditioning, as inputs to a complex correlator 10. The output of complex correlator 10 is supplied to a correlation coefficient circuit 12 to generate a complex cross-correlation coefficient between the right and left beams.

At the same time, an input is provided from the direction sensor to a sensor heading estimator 14 which produces an output $\hat{\phi}$ proportional to the relative angular position between the sensor line-of-sight and the target source. This output is supplied to a sine function generator 16 and a cosine function generator 18 to generate, respectively, $\sin \hat{\phi}$ and $\cos \hat{\phi}$ outputs.

Four quadrant multiplication in complex space is performed by multipliers 20, 22, 24, and 26. More specifically, the output of sine function generator 16 is supplied to multipliers 20 and 22 which receive the real and imaginary components, respectively, of the cross-correlation coefficient from correlation coefficient circuit 12, while the output of cosine function generator 18 is supplied to multipliers 24 and 26 which receive the real and imaginary components, respectively, of the cross-correlation coefficient.

The outputs of multipliers 20 and 26 are summed in summer 28, and the outputs of multipliers 22 and 24 are summed in summer 30. The summed outputs from summers 28 and 30 are then integrated by respective integrators 32 and 34.

The operation of the system can be described as follows. Let the complex input sequence from the right beam be given by $X_1, X_2, \ldots, X_n, \ldots$ and that for the left beam be given by $Y_1, Y_2, \ldots Y_n, \ldots$. Then, the complex correlator 10 and the cross-correlation coefficient circuit 12 compute the complex cross-correlation coefficient between the right and left beams as follows:

$$P_k = \frac{\sum_{i=1}^{N} X_i Y_i^*}{\left(\sum_{i=1}^{N} X_i^2\right)^{\frac{1}{2}} \left(\sum_{i=1}^{N} Y_i^2\right)^{\frac{1}{2}}}$$

where "*" indicates a complex conjugate operation. Note that P has a real and an imaginary component; i.e., $P_k = P_{Rk} + jP_{Ik}$. The output of multiplier 20 is therefore $P_{Rk} \sin \hat{\phi}_k$, the output of multiplier 22 is $P_{Ik} \sin \hat{\phi}_k$, the output of multiplier 24 is $P_{Rk} \cos \hat{\phi}_k$ and the output of multiplier 26 is $P_{Ik} \cos \hat{\phi}_k$.

In the match filter operation, the real part $\phi_{Ri}$ is computed as follows:

$$\phi_R = \frac{1}{K} \sum_{k=1}^{K} [P_{Rk} \cos \hat{\phi}_k + P_{Ik} \sin \hat{\phi}_k] \text{ or}$$

-continued
$$\phi_R = \frac{1}{2\pi} \int_{-\pi}^{\pi} [P_R(t)\cos\hat{\phi}(t) + P_I(t)\sin\hat{\phi}(t)]dt.$$

For a long string of data, a sliding window is used to obatin a continuous output. The sum and integration in the above equations indicates that the system can be either implemented in digital form in computer software or firmware or in analog form in a hardware integrator.

In the match filter operation, the imaginary part $\phi_I$ is computed as follows:

$$\phi_I = \frac{1}{K} \sum_{k=1}^{K} [-P_{Rk}\sin\hat{\phi}_k + P_{Ik}\cos\hat{\phi}_k] \text{* or}$$

$$\phi_I = \frac{1}{2\pi} \int_{-\pi}^{\pi} [-P_R(t)\sin\hat{\phi}(t) + P_I(t)\cos\hat{\phi}(t)]dt.$$

The sliding window technique is also used for the above summation. Again, the sum and the integration in the above equations indicates that the system can be implemented in either digital or analog forms.

Replica generation is as follows. If the center of the sweep is $\theta_T$ which is also an expected target position, and if the rate of the sonar sweep is $\dot{\theta}$, then the replica angle, $\hat{\phi}_k$, is generated as follows:

$$\hat{\phi}_k = \frac{2\pi f_o d}{c} \sin\left(\theta_T + \sum_{k=1}^{K} \dot{\theta}_k \Delta\right) \text{ or}$$

$$\hat{\phi}(t) = \frac{2\pi f_o d}{c} \sin\left(\theta_T + \int_0^t \dot{\theta}(t)dt\right),$$

where $f_o$ is the operation frequency, d is the distance between two offset beam phase centers, and c is the speed of sound. Again, the sum and integration in the above equations indicate that implementation may be made in either digital or analog form.

The sonar platform turn rate, $\dot{\theta}(t)$ or $\dot{\theta}(k)$, is a commanded parameter generated by the host system such as a control host computer. This value can also be a preassigned number stored within a specific memory location within the system. In some applications with mobile sonar platforms such as a torpedo sonar system, the turn rate, $\dot{\theta}$, is obtained through the output of the heading sensor 14.

The output of integrator 32 is supplied to a threshold device 36 and to a squarer 38. The output of integrator 34 is supplied to a threshold device 40 and to a squarer 42. The outputs of the squarers 38 and 42 are summed by summer 44, the output of which is supplied to a third threshold device 46. Thus, the square sum operation is described as $\phi^2 = \phi_R^2 + \phi_I^2$. The threshold device 36 is used to detect the real part $\phi_R$. Detection of the real part occurs when $\phi_R \geq 0.05$, indicating that a target has been detected. Similarly, the threshold device 40 is used to detect the imaginary part $\phi_I \geq 0.05$. Detection of the imaginary part occurs when $\phi_I \geq 0.05$, again indicating that a target has been detected. The threshold device 46 is used to detect the squared sum output of summer 44. If $\phi^2 \geq 0.10$, then a target is declared to be detected.

Figure 2:
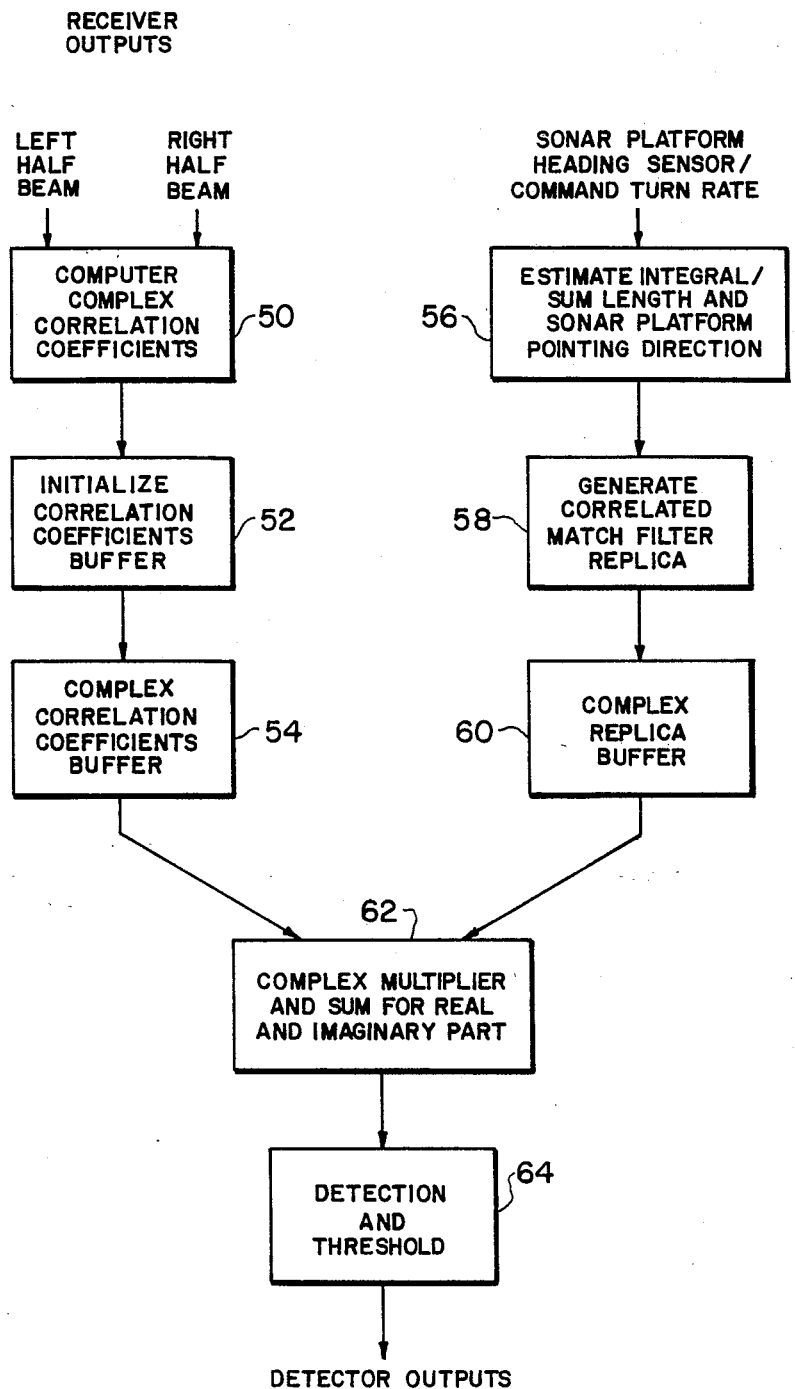
FIG. 2 is a flow diagram showing the logic of the computer program implemented in firmware for performing the operations of the filter shown in FIG. 1.

In a preferred embodiment, the invention was implemented in the Honeywell Array Processor (HAP) and the Honeywell Signal Processor (HSP) in firmware. The HAP and HSP are commercially available co-processors which employ pipline processing techniques. The logic of the firmware is illustrated in FIG. 2.

In function block 50, the subprogram module performs the following function:

$$P_k = \frac{\sum_{i=1}^{N} X_i Y_i^*}{\left[\sum_{i=1}^{N} X_i^2\right]^{\frac{1}{2}} \left[\sum_{i=1}^{N} Y_i^2\right]^{\frac{1}{2}}}$$

where $X_1, X_2, \ldots, X_n, \ldots$ is the complex input sequence from the receiver output of the right half beam, $Y_1, Y_2, \ldots, Y_n, \ldots$ is the complex input sequence from the receiver output of the left half beam, and "*" indicates a complex conjugate operation. In function block 52, all correlation coefficient memory buffers are initialized with the first data point computer by the above equation. Then in function block 54, the correlation coefficient buffer is used to store up to 256 of $P_k$ values.

The sonar platform heading direction is computed in function block 56 by taking the data from commanded data and the output of the heading sensor 14. In addition, an estimate is made of the length of summation required for filter integration. The heading angle, $\theta_T(k)$, is then used to compute the replica angles, $\hat{\phi}_k$, in function block 58 as follows:

$$\hat{\phi}_k = \frac{2\pi f_o d}{c} \sin\left(\theta_T(k) + \sum_{i=1}^{K} \dot{\theta}_k \Delta\right)$$

where $\dot{\theta}_k$ is the sonar platform turn rate from the heading sensor 14. The sine and cosine functions of the replica angle, $\hat{\phi}_k$, k=1, 2, ..., together with integration length K, are stored in the replica buffer which also has 256 memory locations; i.e., the time series $\{\sin \hat{\phi}_k\}$ and $\{\cos \hat{\phi}_k\}$ are stored in replica buffers, as indicated in function block 60.

In function block 62, the real and imaginary outputs are computed according to the following equations:

$$\phi_R = \frac{1}{K} \sum_{k=1}^{K} [P_{Rk}\cos\hat{\phi}_k + P_{Ik}\sin\hat{\phi}_k]$$

$$\phi_I = \frac{1}{K} \sum_{k=1}^{K} [-P_{Rk}\sin\hat{\phi}_k + P_{Ik}\cos\hat{\phi}_k]$$

The output of function block 60 is operated on in function block 62 to make a threshold comparison by comparing it to a fixed value of 0.05; i.e., if $$\phi_R \geq 0.05 \text{ or } \phi_I \geq 0.05,$$

then a declaration is made that there are acoustic sources within the listening direction.

The technique according to the invention improves target detection range five fold. For example, if an energy detector's detection range is 800 yards, then the cross-correlation match filter of the invention can detect a target up to 4000 yards. This is due to the fact that the cross-correlation match filter according to the invention only requires a signal-to-noise ratio of −10 dB for target detection.

Although the invention was implemented and proveed in the Honeywell Array Processor (HAP) and the Honeywell Signal Processor (HSP) in firmware, it could be implemented in any other computer system or other signal processor. Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A passive target detector employing a correlation match filter comprising:
   beam forming means for forming two passive phase offset beams and dynamically sweeping said beats across a target to generate first and second phase offset received signals;
   complex correlation means connected to said beam forming means for generating a complex cross-correlation coefficient of said first and second phase offset signals, said coefficient having real and imaginary parts;
   replica function generating means for generating a replica signal in the form of complementary functions of a relative angle between a sensor line-of-sight and a source of signal to be detected;
   four quadrant multiplier means for multiplying said real and imaginary parts of said coefficient by said complementary functions to generate a plurality of partial products;
   summing and integrating means for accumulating over time the partial products from said four quadrant multiplier means to provide real and imaginary filter outputs; and
   output means connected to said summing and integrating means for generating a detection output if a target has been detected.

2. The correlation match filter recited in claim 1 wherein said output means includes threshold means connected to said summing and integrating means for providing detection outputs when either said real or imaginary filter outputs exceeds a predetermined value.

3. The correlation match filter recited in claim 2 wherein said comparing means further includes:
   square summing means for squaring said real and imaginary filter outputs and summing the squared outputs; and
   second threshold means connected to said square summing means for providing a detection output when the summed squared outputs exceeds a predetermined value.

4. A method for detecting an acoustic source in a correlated or uncorrelated noise background comprising the steps of:
   forming two passive phase offset beams which are dynamically swept across a target to generate first and second received signals;
   continuously cross-correlating said first and second signals to produce a complex correlation coefficient having real and imaginary parts;
   generating complementary functions of a relative angle between a sensor line-of-sight and a source of signal to be detected;
   multiplying real and imaginary parts of said complex correlation coefficient by said complementary functions to produce real and imaginary product signals; and
   accumulating over time said real and imaginary product signals to produce first and second accumulated signals to determine if a target has been detected.

5. The method recited in claim 4 further comprising the step of thresholding said first and second accumulated signals to produce a detection output if either of said first or second detection signals exceed a predetermined level.

6. The method recited in claim 5 further comprising the steps of:
   squaring said first and second accumulated signals to produce squared outputs;
   summing said squared outputs; and
   thresholding the summed squared outputs to produce a detection output if the summed squared outputs exceeds a predetermined level.

* * * * *